United States Patent [19]

Campbell et al.

[11] Patent Number: 5,449,263
[45] Date of Patent: Sep. 12, 1995

[54] DEVICE AND METHOD FOR TORQUE ASSIST OF DRAG ARM

[75] Inventors: David R. Campbell, Salt Lake City; Colin D. Campbell, South Jordan, both of Utah

[73] Assignee: Cambelt International Corporation

[21] Appl. No.: 255,302

[22] Filed: Jun. 7, 1994

Related U.S. Application Data

[63] Continuation of Ser. No. 26,971, Mar. 5, 1993, abandoned, which is a continuation-in-part of PCT/US92/03080, Apr. 15, 1992.

[51] Int. Cl.⁶ ............................................. B65G 65/38
[52] U.S. Cl. ................................. 414/320; 414/322; 414/786; 414/326
[58] Field of Search ..................... 414/306–322, 414/325, 326, 786; 198/511, 518, 519, 510.1

[56] References Cited

U.S. PATENT DOCUMENTS

| | | | |
|---|---|---|---|
| 1,550,311 | 8/1925 | Foster | 414/314 |
| 2,500,043 | 3/1950 | Radtke | 414/318 X |
| 2,711,814 | 6/1955 | McCarthy | 414/326 X |
| 2,788,247 | 4/1957 | Chapman | 414/322 X |
| 2,863,576 | 12/1958 | Trask, Sr. | 414/317 X |
| 2,978,121 | 4/1961 | Chapman | 414/316 |
| 3,139,995 | 7/1964 | Buschbom | 414/322 |
| 3,155,247 | 11/1964 | Patterson | 414/319 |
| 3,199,690 | 8/1965 | Hanson | 414/322 X |
| 3,438,517 | 4/1969 | Steffen | 414/319 X |
| 3,446,371 | 5/1969 | Nicolas | 414/313 X |
| 3,451,566 | 6/1969 | Hanson | 414/320 |
| 3,456,818 | 7/1969 | Massey | 414/315 X |
| 3,462,199 | 8/1969 | Harris et al. | 414/318 X |
| 3,547,283 | 12/1970 | Beebe et al. | 414/321 X |
| 3,698,575 | 10/1972 | Koser et al. | 414/313 |
| 3,749,259 | 7/1973 | Stock | 414/322 |
| 3,755,918 | 9/1973 | Parrot | 414/318 X |
| 3,794,190 | 2/1974 | Lambert, Jr. | 414/315 X |
| 4,162,017 | 7/1979 | Noyon | 414/313 |
| 4,168,805 | 9/1979 | Taylor | 414/318 |
| 4,286,909 | 9/1981 | Tingskog | 414/326 X |
| 4,329,105 | 5/1982 | Buschbom et al. | 414/320 X |
| 4,350,467 | 9/1982 | Soros | 414/313 X |
| 5,098,247 | 3/1992 | Campbell | 414/321 X |
| 5,180,272 | 1/1993 | Campbell | 414/326 X |

FOREIGN PATENT DOCUMENTS

| 353419 | 9/1920 | Germany | 198/519 |
|---|---|---|---|

Primary Examiner—David A. Bucci
Attorney, Agent, or Firm—Thorpe, North & Western

[57] ABSTRACT

An apparatus for removing bulk materials from a laterally enclosed storage area wherein the apparatus may be substantially buried within the bulk material (11). The apparatus includes a support column (16) mounted at a base into a support floor (25). An auger (17) is attached with an axial mount at the base of the support column for enabling rotational declination of the auger from (i) a vertical orientation wherein the auger is nearly parallel with the vertical axis of the support column, (ii) through intermediate angles of declination (54), to (iii) a substantially horizontal orientation (55) wherein the auger is adjacent to the support floor. The suspension cable (61) is coupled between the support column and auger to enable selective adjustment of auger declination. A rotational displacement drive (35) is coupled to the support column to rotate the column about its vertical axis, along with the attached auger. A rotational drive motor (51) is mounted at a distal end of the auger. Rotation of the auger, along with revolution of the support column provide for progressive removal of conical layers of surface material with each 360 degree revolution. Continued declination to the horizontal level enables the total volume of the storage area to be out loaded. A torque assist device (60) is coupled at the distal end of the auger (17) and includes a moving track (61) or circular rim configured to engage the bulk material to thereby provide a tangential, forward force to the auger (17).

23 Claims, 7 Drawing Sheets

DEVICE AND METHOD FOR TORQUE ASSIST OF DRAG ARM

This application is a continuation of U.S. patent application Ser. No. 08/026,971, filed Mar. 5, 1993, now abandoned, which is a continuation-in-part of PCT/US92/03080, filed Apr. 15, 1992.

BACKGROUND OF THE INVENTION

1. Field of Invention

This invention relates to a material delivery/removal system for transporting grain, cement, and other stored materials from a storage bin, dome or other lateral enclosure. More specifically, the present invention relates to a bulk material delivery system which includes a movement or torque assist device for use with a rotating drag arm for pulling the bulk material toward a central outlet.

2. Prior Art

Bulk storage of materials such as grain, cement, dry fuels and other commodities poses many problems which ultimately affect the availability of food, fuels and construction materials upon which each nation's economy depends. These problems range from storage requirements to special handling needs in material transport. The most difficult challenges typically arise when the bulk materials require both a controlled storage environment and unique handling profile during loading and unloading in storage areas.

Such materials include cement and similar bulk commodities which must be stored in a protected atmosphere. Because such materials require total enclosure for protection from the elements, convenient access for retrieval is typically limited. Although movable roofing permits direct use of scoop shovels and buckets to raise the bulk material to nearby trucks or rail cars, such facilities and methods are labor intensive and require a significant capital investment for equipment and special construction of buildings. As a consequence, industrial trends have focused on reducing the cost of storage and handling by simplifying construction of storage areas.

For example, free-standing dome structures have combined economical construction with the benefits of total enclosure. U.S. Pat. No. 3,456,818 illustrates a dome structure used for storing grains. Bulk materials are loaded within the dome through a top opening and are distributed outward by a rotating auger or drag arm that drags the grain outward toward the laterally enclosing dome wall. This auger is designed to rotate along its longitudinal axis on top of the grain, as well as rotate radially around a center support post to provide redistribution of grain across the 360 degree top surface area of the grain. This dual rotation of the auger functions to maintain the auger in a "floating" configuration on top of the grain storage surface. The weight of the auger is carefully selected to enhance this floating performance as a necessary part of the system.

Outloading is accomplished by rotation of the center support post without the need for rotation of the auger about its longitudinal axis. An outlet port is formed in a floor surface below the support post and includes a subfloor auger which acts as a conveyer to transport material as it drops by gravity flow from the interior of the dome. Once the grain has reached its natural declination of flow toward the central outlet port, the auger is activated to drag the remaining grain toward the center. Eventually, the total contents of the dome can be swept to the outlet port as the rotating auger cycles to a horizontal orientation near the floor surface.

Although the dome storage structure with transport system was invented approximately 25 years ago, it has experienced only limited commercial success. Its apparent limitation for use with bulk materials having physical properties similar to grains also inhibits its utility in other demanding storage needs such as with cement and other dry goods which are subject to greater compaction. These latter materials will naturally congeal to a rigid mass under the weight of the stored upper layers. This rigid mass is very difficult to break up and effectively blocks gravity flow of stored materials into the outlet. Because the auger assembly is designed to float on top of the grain, it has no significant influence on desired subsurface material movement.

In view of the numerous problems with the referenced dome storage system, access for movement of stored materials has generally been provided by lateral doors or openings at the base of the dome. These doors are opened and permit front-end loaders to use conventional loading techniques with scoop buckets or similar equipment to transport the materials. Unfortunately, highly compacted commodities such as cement do not readily collapse with removal of under support material. Indeed, a front-end loader may form a cavern opening of considerable size within the rigid base layer of material which could collapse without warning, causing potentially fatal results.

Earlier patents of this same inventor as represented by U.S. Pat. Nos. 5,098,247 and 5,180,272 and European patent application PCT/US/03080, filed Apr. 15, 1992 disclose an improved system for outloading bulk materials which utilizes a rotating auger which moves from a vertical orientation, sequentially to a horizontal position to complete removal. A significant problem with the use of such a mechanism arises because of the increased moment arm required to rotate the extended auger as the center of mass continues to displace from the vertical support column. Normal design criteria dictates that the power rating of the drive motor be selected to meet the peak power demand which occurs when the auger is in a near horizontal orientation. Alternatively, a more extensive gear box or transmission system may be incorporated to provide the increased power requirement. Unfortunately, the increased power requirement and or gearing system adds substantial expense to the overall system cost.

The increased load required by the greater moment arm is further compounded by resistance offered by the compacted bulk material which is to be removed. These two problems compound each other because as the moment arm increases with greater declination of the auger, the compaction of the material also increases because of the increased weight of overhead materials. Therefore, by the time the auger reaches the near horizontal position in rotation, the worst conditions exist. Specifically, the auger is in its most extended orientation and the material is at maximum compaction because this material has born the weight of the total material above.

The problem of increased compaction also arises with traditional storage structures. For example, U.S. Pat. No. 2,711,814 discloses an auger useful for cleaning flat bottoms of a grain tank. Related auger transport devices have been used in silo storage systems, such as disclosed in U.S. Pat. Nos. 2,500,043; 3,755,918; 3,155,247 and 3,438,517. These patents are representative of a broad range of applications for the transport properties of an auger within a grain bin. Experience has shown that such an auger system is not likely to be practical with respect to bulk materials which experience greater compaction, forming a rigid base layer. It is perhaps for this reason that much of the prior art technology utilizing an auger transport system is directed toward grains and other bulk materials which have less tendency to compact under pressure. The more flowable condition of these grains enables the outloading in conventional storage bins by mere gravity flow.

The auger transport system in these disclosures functions primarily to redistribute bulk material toward the center of the storage bin to keep gravity flow in process throughout the outloading procedure. They are not generally intended to be responsive to changing compaction conditions that occur as the rotating auger progresses toward the bottom of the bin. In the latter case, conventional design criteria would again dictate that greater power would be provided by increased motor power and/or an improved transmission system.

Several patents disclose devices for providing torque assist to the rotating arm or auger. For example, U.S. Pat. No. 1,550,311 by Foster illustrates a rotating drum having closely positioned grooves or teeth to urge the rotating arm along its rotating path. Because of the close proximity of the teeth, further compaction by the rotating drum is disturbed by the movement action caused by the teeth themselves. Such a configuration severely limits the ability of the rotating drum to operate with respect to heavily compacted materials. U.S. Pat. No. 2,711,814 by McCarthy illustrates the use of a rotating wheel which rotates with the auger when in the horizontal position. This wheel is primarily for the purpose of supporting the shaft at floor level and does not offer significant torque assist when suspended on the compacted material. U.S. Pat. No. 3,451,566 by Hansen illustrates the use of a crawler-type device which appears to have open track elements for engaging a top surface of the stored material to push the rotating augers about their circular path. Hereagain, the crawler type device does not appear to be configured to enhance the ability of the compacted surface by minimizing disturbance of this compacted material. To the contrary, the close proximity of the track elements and the absence of a compacting surface associated with the track elements suggest that as each track element penetrates the storage material, it will loosen and reduce the resistance offered by surrounding compaction material with respect to the next blade to be engaged. This loosened material then offers less ability to advance the crawler-type drive unit. Although this may be suitable for silage in a frozen condition, its application to broader varieties of compacted materials is limited. Finally, U.S. Pat. No. 3,794,190 by Lambert, Jr. discloses the use of outer drive wheels for turning the rotating augers, but without engaging the compacted material as the drive surface. Rather, such units utilize a circular ring gear which engages a rotating sprocket positioned above the stored material.

None of these references resolve the problem of loss of traction between the blades or teeth of the rotating wheel or track and the stored material. Indeed, the disclosed torque assist devices have an array of teeth or track elements which are closely positioned and otherwise configured to disturb the compacted material. This disturbed or loosened material has less ability to resist movement and a weakened resistance force to push the torque assist device and attached drag arm in a desired forward or rearward direction.

OBJECTS AND SUMMARY OF THE INVENTION

It is an object of the present invention to provide an auger transport system which is capable of processing compaction materials such as cement in a rotary drag system, as well as looser materials such as grains, without adding extreme cost increase or enhanced power demands for the drive motor.

It is a further object of the present invention to provide a material transport system useful within a dome structure having an inclining drag arm which permits the dome structure to be completely filled, essentially burying the material transport system used in outloading.

It is a still further object of the present invention to provide an auger transport system for bulk materials stored within a lateral enclosing storage structure, wherein the transport system can service all forms of particulate bulk materials, including compactable materials.

It is another object of this invention to provide a torque assist device for use at the end of the auger or drag arm which maintains traction and compaction at the propelling surface upon which blades or teeth of the assist device operate.

These and other objects are realized in an apparatus for removing bulk material by a rotating drag arm designed to be substantially buried within the bulk material, as opposed to merely floating on top of such material. This apparatus includes a support column having a top end, a bottom end, and a vertical axis. A base mount is configured for attachment between the bottom end of the support column and a support floor contained within the storage area. This base mount provides a fixed vertical orientation to the support column within a central section of the storage area. First elongate transfer means is coupled at its base end to the support column for dragging particular bulk materials along its length to a dispensing outlet near the base of the support column. A distal end of the first transfer means is adapted for attachment to a first support frame, which is also characterized by a base end, distal end and intermediate support section. The support frame functions to support the first transfer means, enabling it to rotate about the support column. A first drive motor is mounted at the first transfer means and support frame and operates to apply a drive force to the first transfer means. A rotational displacement drive is coupled to the first support frame for rotating the first support frame about the vertical axis of the support column. A torque assist device is coupled at the first elongate transfer means and includes a moving contact surface configured to engage and compact a top surface of the bulk material. This contact surface includes a plurality of projecting teeth having sufficient length to penetrate the top surface and provide a gripping force to urge the torque assist device and first transfer means along the top surface. Each of these teeth is displaced a sufficient distance from other projecting teeth such that entry of each tooth into the top surface of the bulk material does not disturb adjacent material compaction to be engaged by following teeth. Therefore, the desired gripping force support of the bulk material penetrated by the subsequent projecting teeth is preserved. The assist device is oriented with respect to the first elongate transfer means to apply a tangential, gripping force along the rotational path of the first elongate transfer means in response to resistance of the compacted bulk material against the projecting teeth.

A method for removal of stored bulk materials using a elongate transfer means such as a rotating drag arm in a lateral enclosure is similarly disclosed and includes the step of activating movement of a torque assist device coupled at the distal end of the first elongate transfer means to provide additional forward force to the drag arm. This torque assist device is positioned to engage a top surface of the compacted bulk material by advancing a moving contact surface with projecting teeth penetrating the top surface to apply a tangential, forward force along the rotational path of the first elongate transfer means in response to resistance of the bulk material against movement of the torque assist device, but without disturbing compaction of the top surface of bulk materials for contact with teeth as subsequently contacted by moving surface.

Other objects and features of the present invention will become apparent to those skilled in the art, in view of the following detailed description of preferred embodiments, taken in combination with the accompanying drawings.

DETAILED DESCRIPTION OF THE INVENTION

Figure 1:
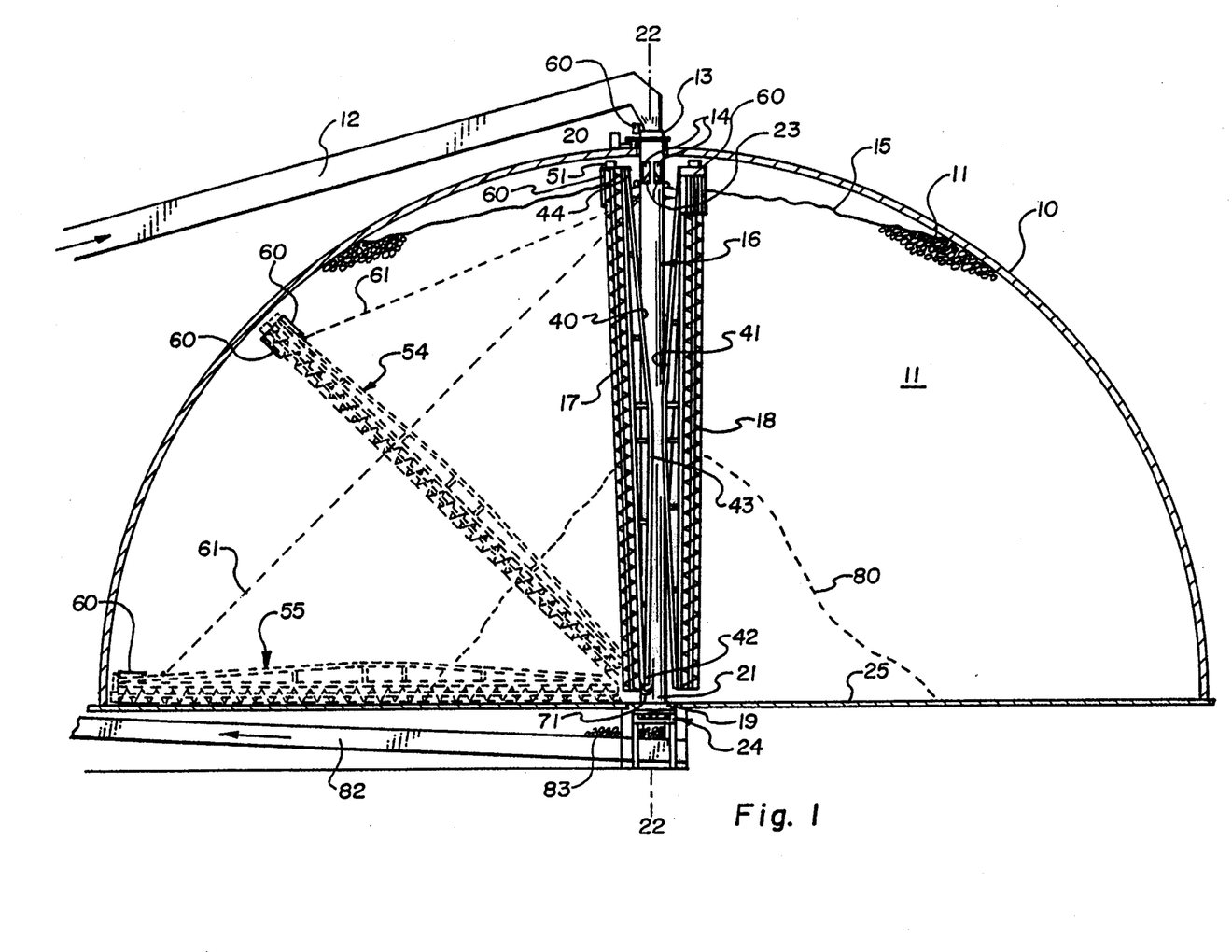
FIG. 1 shows a medial cross section of a dome storage structure utilizing an auger transport system constructed in accordance with the present invention.

FIG. 1 demonstrates an embodiment of the present invention in combination with a dome structure 10 which operates as a total enclosure for stored bulk materials 11. It will be apparent to those skilled in the art that these materials have been loaded by a conventional loading conveyor 12 through an inlet 13 at the top of the dome structure. This bulk material falls through opening 14 and spreads across the interior chamber of the dome, reaching a top level as indicated at item 15. It is plain to see that the total bulk material 11 has substantially covered a central support column 16 and attached auger transport devices 17 and 18. The transport devices 17 and 18 may alternatively comprise other transfer means known to those skilled in the art, such as bucket or paddle transfer systems.

The dome construction 10 has been illustrated with the present invention because of its particular advantage within the hemispherical dome shape wherein the auger device 17 is comparable to a radial distance throughout the contained volume of the storage area. In addition, however, the domed construction is representative of the more difficult storage problems, particularly in terms of outloading compacted materials. Accordingly, this embodiment incorporates the more stringent of the material transport conditions wherein access to the contained volumes are limited to an upper opening 13 and a lower outlet 19. It will be apparent to those skilled in the art that the same principles applied with respect to this dome structure could be applied with respect to any enclosed storage area having lateral confinement.

The apparatus of the present invention includes a support column 16 which has a top end 20, and a bottom end 21 and a vertical axis 22. The support column comprises a steel post which is hollow down its length except for a pair of deflection plates 23 which divert bulk materials transported from the loading conveyor 12 through lateral openings 14 in the support column.

This support column is vertically positioned in a base mount 24 which is attached between the bottom end of the support column 21 and a support floor 25 contained within the storage area. This base mount provides fixed vertical orientation with respect to the support column within a central section of the storage area. In the illustrated embodiment, this base mount is configured for rotational movement about the vertical axis 22.

Specifically, the base mount includes an annular converging channel or hopper 26 whose bottom end 29 defines an outlet port which disposes the bulk materials onto a conveyor belt or other transport means for carriage to a pickup location such as transport trucks or rail cars. This channeling hopper 26 is supported on a plurality of rollers or bearings 27 which ride on a support ring 28 structurally configured to bear the load of the support column 16 and its attached augers 17 and 18. The support column 16 is integrally coupled to the channelling hopper 26 with brace members 30 which are welded at the base of the support column on one side and lower portion of the hopper structure on the other side. This permits a protective flap 32 to slide along the top hopper edge 31 and protect against grain falling free of the hopper. In essence, this flap 32 operates as an angular sleeve to channel material from the storage area into the outlet 29 while the hopper is rotating in concert with the support column.

Similarly, the top end 20 is supported in a rotational configuration within the top opening 33 of the dome. As set of rollers or bearings 34 stabilize the support column 16 in vertical orientation. A drive motor 35 and chain drive 36 are coupled at the top of the support column 16 and operate as a rotational displacement means to rotate the support column about its vertical axis 22.

The respective base mount 24 and upper roller system 34 cooperate to fix the support column 16 in a sturdy, rotational configuration at a central section of the storage area. Rotation rate about the vertical axis 22 is adjusted to the outflow rate of stored material and is governed by the chain drive 36 and electric motor 35, which is housed exterior to the dome structure 10. This enables maintenance to be performed with respect to this drive system without need for access within the dome interior.

Figure 2:
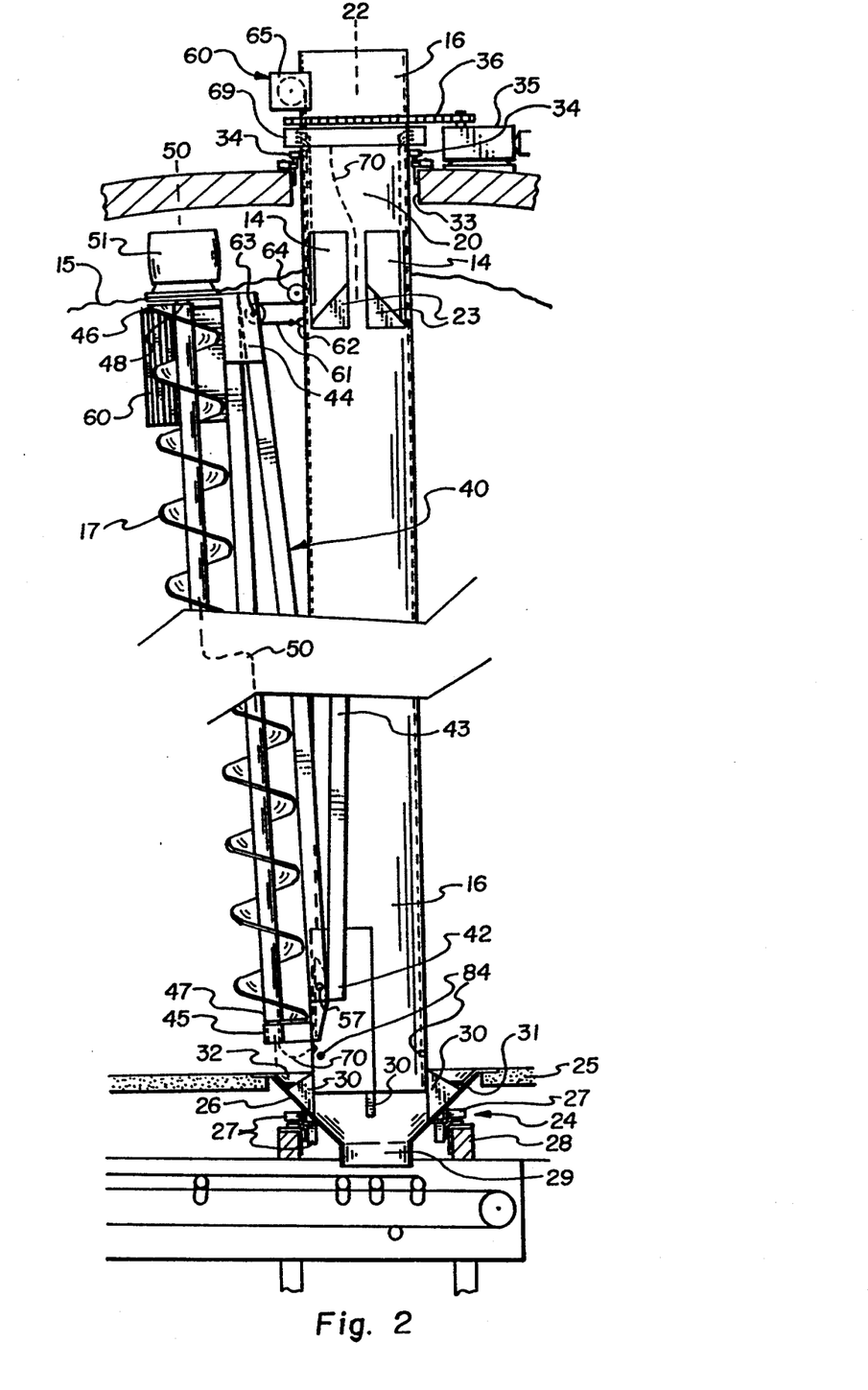
FIG. 2 illustrates a segmented, partial cut-away section of the support column with attached auger in vertical orientation at one side thereof.
Figure 3:
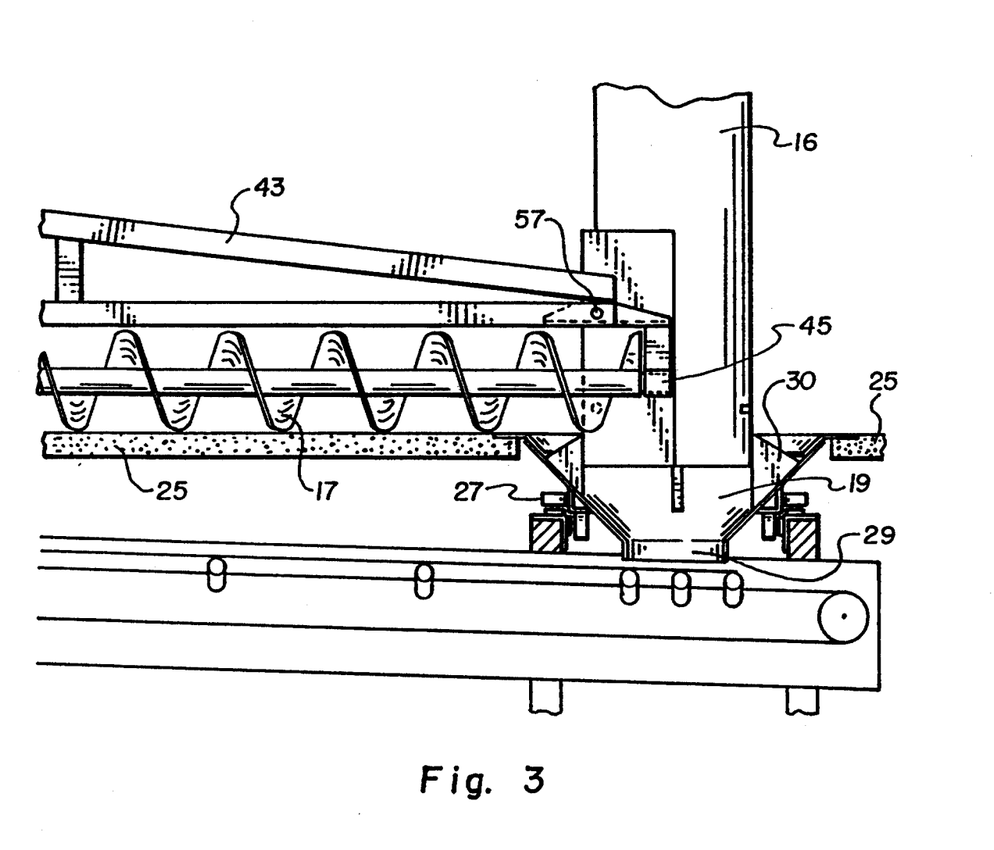
FIG. 3 shows a partial view at the base of the subject support column, with the auger transport system in horizontal, ground level position favoring use of the torque assist device of the present invention.
Figure 4:
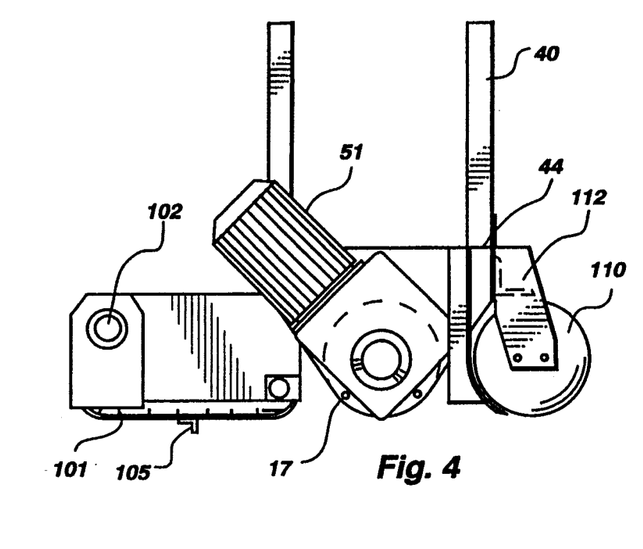
FIG. 4 is an end view of an auger transport system with a torque assist device and second auger system for clearing a motor path.

Attached to the support column is at least one auger support frame 40 and 41. FIG. 4 shows a support column having two such support frames and attached auger assemblies 17 and 18, further description shall be directed toward the auger configuration 17 alone. It is to be understood that a comparable description could be provided with respect to the second auger 18 which is illustrated in FIG. 1. FIGS. 2 and 3 do not include the second auger in view of its symmetrical duplicity with the disclosure relating to auger 17.

The auger support frame 40 includes a base end 42, intermediate section 43 and distal end 44. The assembled configuration of these components forms an elongate truss support span which extends from the top end 44 to the bottom end 42 and includes mounting end plates 45 and 46 with bearing mounts coupled thereto for receiving the respective base end 47 and distal end 48 of the auger 17. This auger 17 is configured for rotational movement about its rotational axis 50 and functions to drag particulate bulk materials along the length of the auger toward the hopper 26 and dispensing outlet 27. The auger support frame 40 operates to support the auger 17 during this rotational movement and provide means for inclining the auger at varying angles as it revolves about the support column 16.

The present invention requires mounting of a rotational drive motor 51 at the distal end 48 with respect to the end plate 46 on the auger support frame. This is in direct contrast with prior art trends of positioning the drive motor on auger transport systems near the support column, and at a base end of the auger. Disposition of the drive motor 51 at a distal end of the auger maintains the motor above the top level 15 of bulk material. For example, with full capacity storage as shown in FIG. 1, the drive motor 51 stands above the material level 15 by virtue of its vertical orientation. During outloading, the auger is gradually displaced in a conical revolution pattern, cutting away respectively at conical layers of bulk material. As the auger is further inclined away from the central column 16 (see phantom line examples 54 and 55), the rotational drive motor 51 is always positioned above material storage levels. This preserves life of the motor and facilitates its continuous operation to service all stages of outloading. This is in direct contrast with prior art systems which depend primarily on free fall of the bulk materials through the outlet.

In these prior art embodiments, the auger transport system is primarily functioning to collect a remaining portion of the bulk materials left around the periphery of the floor wherein the declination of stored materials facilitates free fall of the particulate matter to the outlet. The present invention adopts a new strategy which comprehends not only the flowable grain material of prior art auger applications, but also covers materials such as cement and other highly compactable substances.

Declination of the auger 17 is enabled by use of an axial mount 57 which couples between the base of the auger support frame 42 and a bottom end of the support column 16. This structure permits the auger support frame to rotate vertically about the axial mount 57 to enable rotation declination of the auger and support frame from (i) a vertical orientation (solid line representation of item 17) wherein the auger is nearly parallel with the axis 22 of the support column, (ii) through intermediate angles of declination (represented by phantom line drawing 54) to (iii) a substantially horizontal orientation (representation 55) wherein the auger is adjacent to the support floor of the storage area.

Selection of the specific declination angle is accomplished by use of a variable suspension means 60 which is coupled between the support column and the auger support frame and enables various selection and adjustment of auger declination by permitting rotational declination with respect to the axial mount. Specifically, this suspension means includes the suspension cable 61 which is attached at a first point of attachment 62 near the top end of the support column. This cable is next supported on a first pulley 63 which is attached near the distal end of the auger support frame 44. This cable is further supported on a second pulley 64 which is attached to the support column between the first point of the attachment and the top end 20 of the support column. A second end of the suspension cable is coupled to a winch or other drive system 65 having a fixed location with respect to the support column.

The winch 65 operates in a conventional manner to reel in and let out suspension cable to selectively incline the auger at a desired position. The winch 65 operates as a control means for incrementally advancing the auger through a series of predetermined declinations which increase in angle of declination with respect to the support column with each successive 360 degree revolution of the auger about the vertical axis 22. It will be apparent that although only two inclined positions are reflected in FIG. 1, the variety of declination angles is continuous from the vertical orientation shown in solid line for auger 17 through all intermediate angles to a horizontal configuration illustrated as item 55.

Electrical support for the respective components is provided by conventional wiring configurations. Hydraulic support is also feasible. For example, all wiring support for the rotational drive motor 35 and winch 65 are external to the dome and enable direct access for maintenance. Electrical support to the winch and its rotatable configuration as part of the support column is provided by a slipring assembly 69. The same conductive slipring provides an electrical connection identified by dashed line 70 which extends the length of the support column and passes from the base of the support column up through a central tube opening within the auger support frame 40 to the drive motor 51. All electrical lines are appropriately anchored and shielded to prevent wear with the anticipated patterns of movement for both the auger and the support column. Hydraulic support is also feasible.

Figure 5:
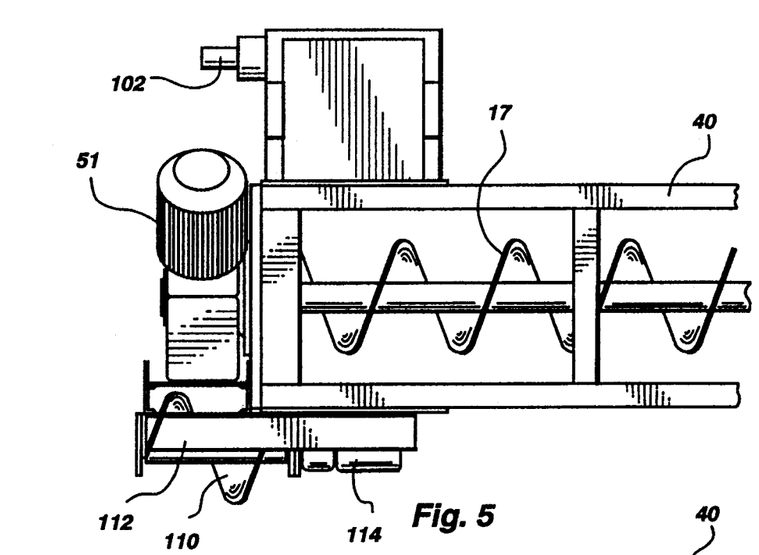
FIG. 5 is a top view of the system shown in FIG. 4.
Figure 6:
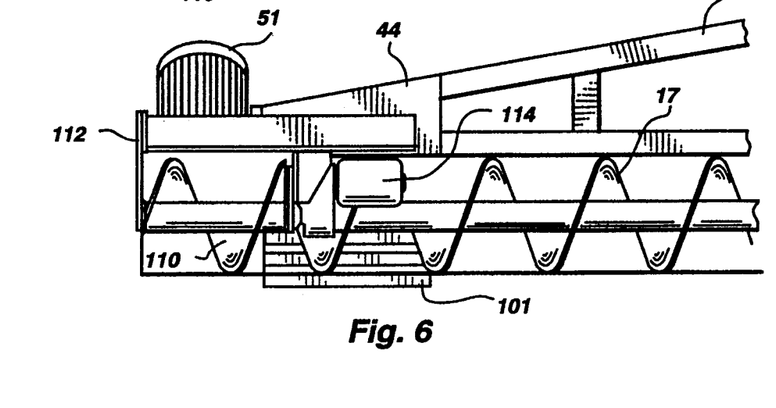
FIG. 6 is a front view of the torque assist device of FIG. 4.

Referring now to FIGS. 4 to 6, the auger 17 and support frame 40 are shown having a secondary auger 110 attached at the distal end 44 of the support frame 40, to the side of the drive motor 51. The secondary auger 110 may alternatively comprise other transfer means known to those skilled in the art, such as bucket or paddle transfer systems. The secondary auger 110 is supported by a secondary support frame 112 in which the auger 110 is rotatably mounted. The secondary support frame 112 is secured to the side of the distal end 44 of the support frame 40 by welding or other suitable means. A secondary rotational drive motor 114 is mounted to the secondary support frame 112 at the proximal or base end of the auger 110 to the support column 16, to rotatably drive the auger 110. Since the auger 110 is smaller than the auger 17, the drive motor 114 is correspondingly smaller than the motor 51.

Although the motor 51 will be maintained above the top level 15 of the bulk material under ideal conditions, in practice the motor 51 sometimes comes in contact with the material and pushes the material in front of it with no opportunity for the auger 17 to access the material and move it out of this path of movement. The material in front of the motor 51 also strains the support column drive motor 35 and causes it to operate inefficiently.

The secondary auger 110 removes material that may otherwise build up against the motor 51, and moves it down to the auger 17 for removal. The secondary motor 114 does not experience any substantial material buildup against it since the motor 114 is relatively small and allows access to the auger 17. The motor 114 has an electrical power connection through the auger assembly and support column similar to the connection powering the motor 51. To be effective, the auger 110 should be mounted to the front side of the motor 51, i.e., the side pushing against the material during rotation of the support column. Although mounting of the motor 114 on the proximal end of the secondary support frame 112 is preferred, the motor 114 may alternatively be mounted on the distal end of the support frame 112, if desired.

Figure 7:
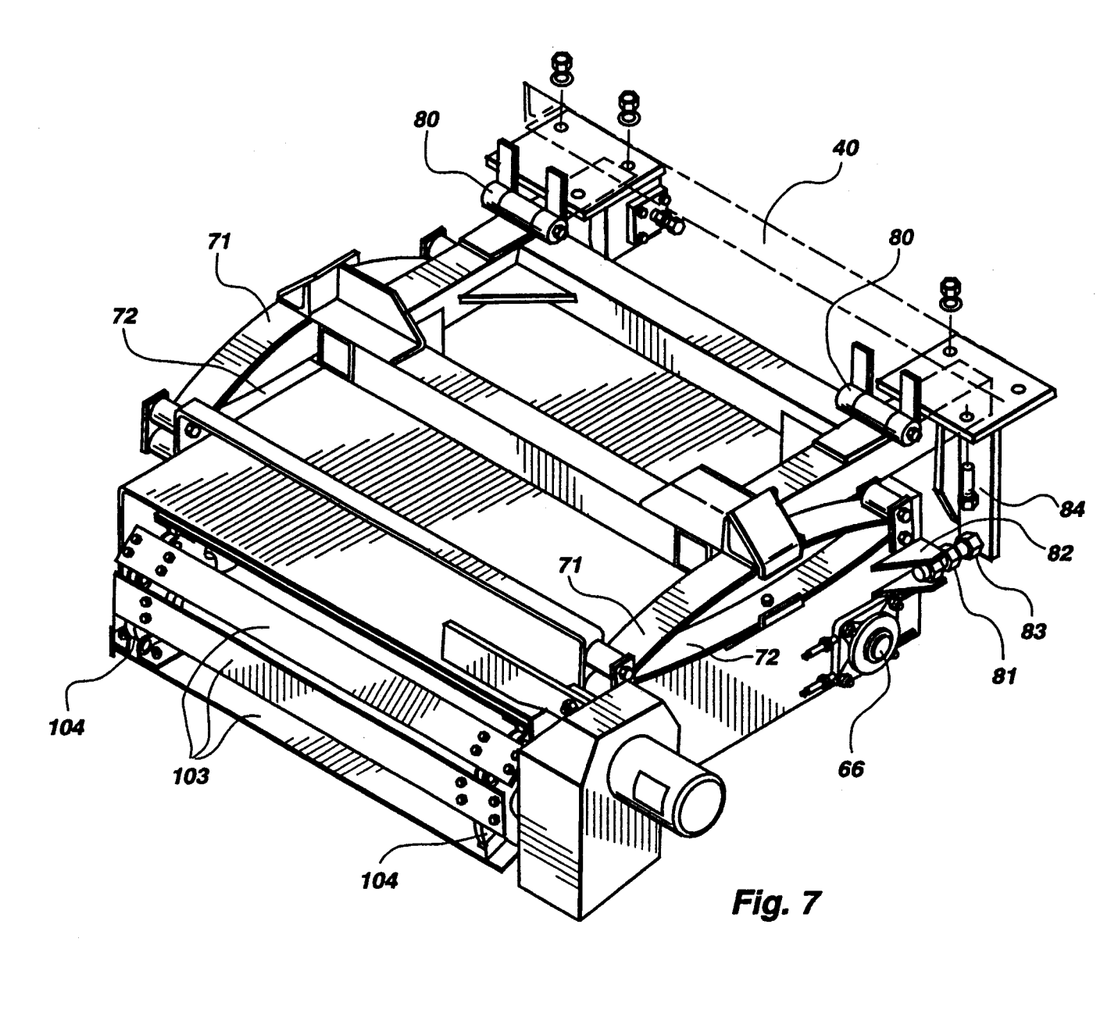
FIG. 7 is a perspective view of the torque assist device for use in the invention as illustrated in FIG. 4.
Figure 8:
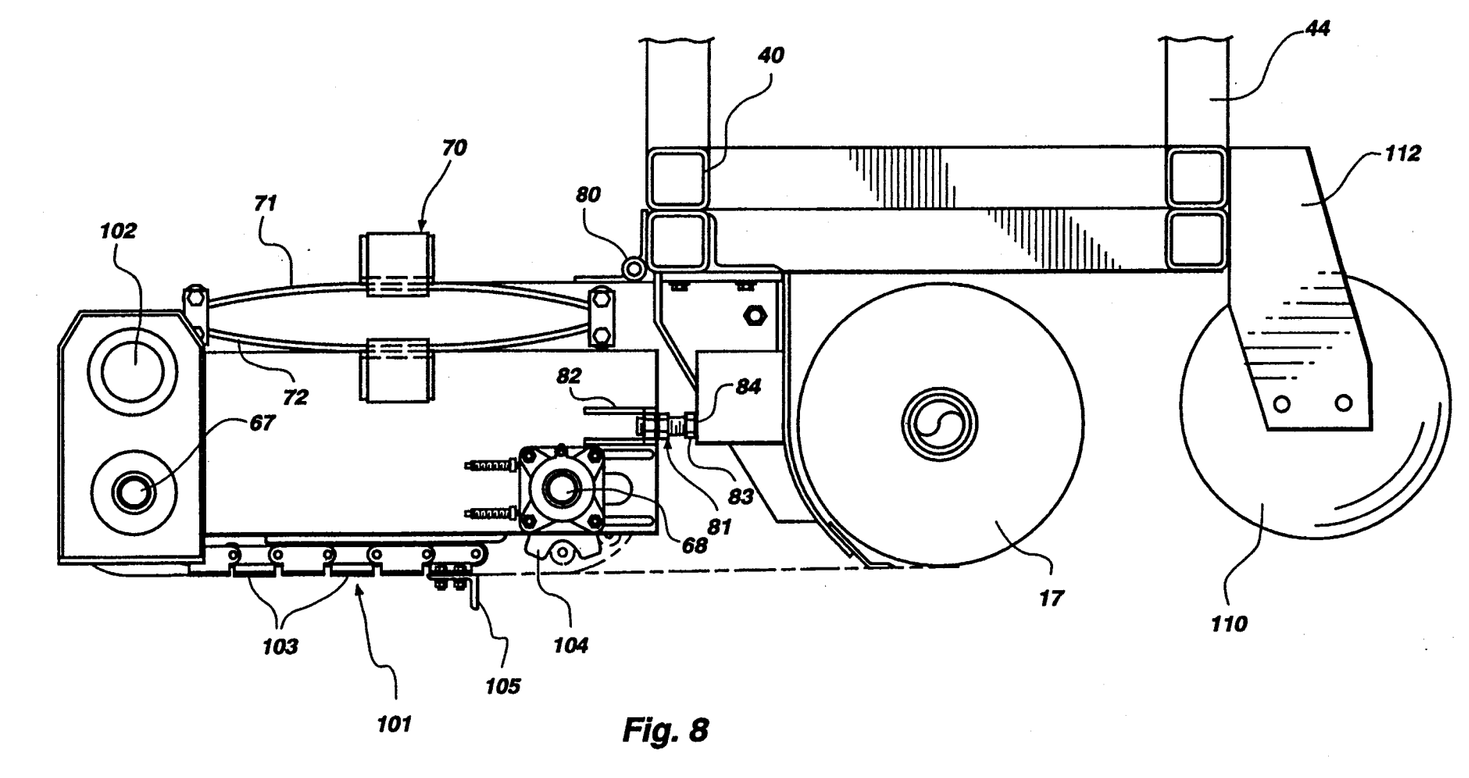
FIG. 8 is a side view of the torque assist device of FIG. 7.
Figure 9:
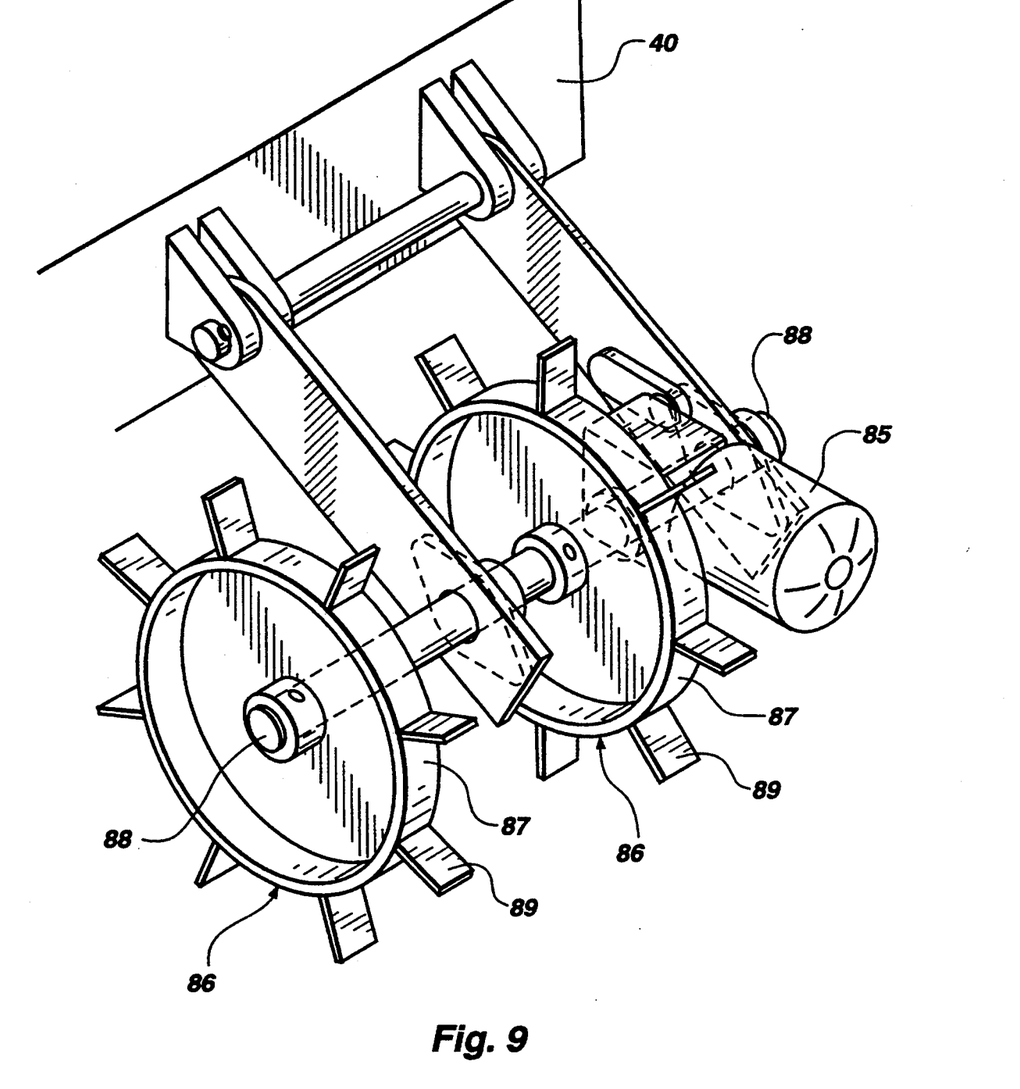
FIG. 9 is a perspective view of an additional embodiment of a torque assist device in accordance with the present invention.

FIGS. 7, 8 and 9 disclose a primary feature of the present invention which consists of a device for providing additional drive force to move the first elongate transfer means as it encounters increased resistance with progressive declination toward the horizontal orientation. Because the drive motor 35 which rotates the first transfer means is mounted to the support column 16, each sequential adjustment away from the vertical support column extends the center of mass of the first transfer means outward, increasing the force required to rotate this structure. As the first transfer means moves substantially toward the horizontal, such as at declinations greater than forty degrees from the vertical axis 22, this increased load imposes a greater drag on the drive motor 35. This load is further increased by the additional drag encountered by the first transfer means as it moves against the bulk material which is now less susceptible to gravity flow.

To overcome the need for introducing expensive gearing to provide this increased power output to the first transfer means, a torque assist device is coupled to the frame 40 or associated structure at the distal end of the first elongate transfer means. This device includes a moving surface or track, designated generally at 101 (see FIG. 8) which is driven by a motor 102. The embodiment of FIGS. 4 to 6 comprise a track configuration wherein the track 101 is configured to engage a top surface of the bulk material and propel itself across this surface to apply a tangential, forward force along the rotational path of the first elongate transfer means in response to resistance of the bulk material against the moving track. It is positioned behind the moving auger 17 so that the track rides on a fresh-cut surface of compacted material.

The track 101 specifically comprises a rotating track assembly of individual track pads 103 which are supported on a rotating track carrier 104. At least one track element 105 (FIG. 8) is coupled to one of the track pads 103 and projects outward from the track assembly to provide a gripping edge which extends into the bulk material as the track assembly moves along its surface. It is preferable to have a minimum number of track elements 105 engaging the bulk material at a time, so that the compacted surface is not significantly disturbed. In this manner, the fresh-cut surface provides traction to the track pads and is not merely pushed rearward by the rotating track assembly. The track element 105 ensures some grip at this surface to maintain uniform track movement.

The track assembly is driven by a variable drive motor 102 which is coupled to the track carrier through a drive axle 67 to provide power to rotate the track carrier and track assembly at variable speeds. A front axle 68 rotates freely and supports a forward element of the track carrier 104.

The variable speed is developed by a power regulator which is responsive to rotational rate of the first elongate transfer means about the support column. This power regulator includes means to adjust the speed of the track carrier to match the rate of movement of the first elongate transfer means. This speed should be matched so that the torque assist device complements forces being applied to the first transfer means. If the speed of the torque assist device were unmatched, the torque assist device would impose additional drag (at a slower speed) or would attempt to push drive motor 35 above its intended rate (at higher speeds). In the latter case, the track elements simply dig into the bulk material and reduce the effectiveness of the track for developing a forward force.

An additional preferred embodiment of a torque assist device is shown in FIG. 9 attached to the frame 40 which supports the auger. This device replaces the track device of FIGS. 4 to 8 with a pair of circular rims 86. The circular rim provides a moving contact surface which comprises an outer surface 87 of the circular rim mounted on a central axle 88, which is a common axle to the pair of circular rims and operates as a drive shaft powered by a drive motor 85. A plurality of teeth 89 project from the outer surface 87 of the rim to provide the force for movement. The relative position of the teeth of the respective rims are offset to maintain firm engagement of at least one tooth in the material.

Although the dimensions may vary for components of the circular rim, it should have a width sufficient to ride along the top of the compacted material without digging or otherwise disturbing the material. The illustrated embodiment has a width of at least one inch and may extend up to twelve inches for larger models. The present embodiment is 2½ inches. The teeth comprise blades of rectangular configuration. The circular rim has a radius of at least five inches, and preferably 7 to 24 inches. The distance between adjacent teeth is at least ⅛ the length of the radius and no more than approximately $$\frac{\pi r}{4}$$

to ensure the constant engagement of at least one tooth in the compacted material. At the same time, teeth should not be so close that adjacent compacted material for one tooth will be disturbed by another tooth.

To further ensure that the teeth do not disturb compacted material for subsequent teeth, their length should be less than ½ the length of the radius and preferably within the range of 1/16 to ⅛ the radius length. The radius of the circular rim in the illustrated embodiment is approximately 7 inches, making the distance between the teeth approximately 5½ inches, and the length of the teeth approximately 2½ inches.

Typical linear speed for the combined first transfer means and attached torque assist device will range from as low as several feet per minute, up to high speeds in excess of 60 feet per minute for cuts of lesser depth. Actual speeds will also vary on type of bulk material involved and the extent of compaction. In all cases, the selected speed is matched for the respective drive systems of the transfer means and torque assist device.

Generally, the elongate transfer means is mounted to the frame of the first transfer means such that the vertical level of the track which engages the surface of the bulk material will be at least as low as the vertical level of the lowest edge of the first elongate transfer means which immediately precedes a path of movement for the track. This relationship properly positions the track for engagement with a freshly exposed surface of bulk material resulting from displacement a surface layer of material by the first elongate transfer means. It is important that the track or torque assist device impose a substantial load on the exposed surface to enhance compaction and increase resistance for movement. Accordingly, the suspended height of the track, but for the limiting height of the material, should be substantially below the bulk material surface to allow the full weight of the device to float at the material surface. With looser materials additional weight can be added to the device to increase the compaction load.

A retractable suspension system 70 is provided to protect the torque assist device from being damaged by obstacles. Because it is rigidly bolted to the frame 40 of the transfer means, the small size of the torque assist device will tend to follow at the fixed elevation of the transfer means. Although the rotating auger of the transfer means can pass chunks of material through its spiral blade, the fixed track pads are unable to yield. Therefore, the suspension system includes means for displacement of the track out of a path of forward movement when an obstacle is encountered which would otherwise block forward movement of the track. In the first illustrated embodiment, spring elements 71 and 72 fulfill this need.

The first illustrated embodiment also has a further safety feature which allows the device to rotate out of the path of a large obstacle. This arises by attachment of the device by means of a hinge mechanism 80 which allows the device to rotate up and out of the path of the obstacle. Angular adjustment of height is provided by a threaded adjustment bolt 81, which is mounted to the torque assist device at flange elements 82. The head portion 83 of the bolt 81 abuts against a stop plate 84 which extends from the support frame 40.

It will be apparent that numerous variations in structure can be implemented to apply the inventive aspects of this disclosure. As is illustrated in FIG. 1, a second elongate transfer means 18 may be positioned in opposing orientation to the first transfer means 17. Its construction is similar to the first, having a torque assist device positioned in a trailing orientation with respect to the second transfer means.

Generally, these variations all embody a common methodology, represented by the steps of:

positioning a support column having a top end, a bottom end, and a vertical axis at a central location of the storage area;

securing a base mount between the bottom end of the support column and a support floor contained within the storage area, said base mount providing a fixed vertical orientation to the support column within a central section of the storage area;

attaching to a first support frame a first elongate transfer means for dragging particulate bulk materials along a length of the first transfer means toward a dispensing outlet near the base of the support column, said first transfer means having a base end and a distal end;

attaching the first support frame at a base end thereof to the support column with an axial mount for enabling rotational declination of the first transfer means and first support frame from (i) a vertical orientation wherein the first transfer means is nearly parallel with the vertical axis of the support column, (ii) through intermediate angles of declinations, to (iii) a substantially horizontal orientation wherein the first transfer means is adjacent the support floor of the storage area;

coupling a first drive motor to the first transfer means and first support frame, said first drive motor further including means to apply a drive force to the first transfer means;

storing bulk material within the lateral storage area wherein the first transfer means is at least partially buried within the bulk material with the first transfer means at an declination greater than fifty degrees with respect to the support floor;

commencing removal of the bulk material by activating the first drive motor on the first transfer means, thereby assisting free fall along an inclined flow of stored bulk materials to an outlet port in the support floor of the storage area;

concurrently rotating the first transfer means with the activated drive motor about the vertical axis of the support column to remove a conical volume of bulk material forming an declination of exposed surface of bulk material of greater than forty degrees with respect to the vertical axis;

positioning the first transfer means in an inclined orientation of less than fifty degrees with respect to the support floor;

activating movement of a torque assist device coupled at the distal end of the first elongate transfer means and positioned to engage a top surface of the compacted bulk material, said assist device being oriented with respect to the first elongate transfer means to apply a tangential, forward force along the rotational path of the first elongate transfer means in response to resistance of the bulk material against movement of the torque assist device.

sequentially and incrementally lowering the first transfer means with each successive revolution to remove successive layers of bulk material.

The significant advantage offered by the addition of the torque assist device to the disclosed system has been confirmed by experimental results. For example, it was discovered that to generate 2 horsepower of drive from a top drive motor 35 rated at 2 hp, out to the end of the first transfer means when horizontally disposed, requires $20,000 of special gearing for a conventional dome storage area. This cost is eliminated by attachment of a torque assist device at a cost of $3000. This translates to a savings of $19,000.

It is to be understood that the foregoing description of preferred embodiments is merely by way of example and is not to be construed as limiting with respect to the following claims.

I claim:

1. An apparatus for removing bulk materials from a laterally enclosed storage area wherein the apparatus may be substantially buried within the bulk material, said apparatus comprising:

(1.1) a support column having a top end, a bottom end, and a vertical axis;

(1.2) a base mount configured for attachment between the bottom end of the support column and a support surface within a central section of the storage area;

(1.3) first elongate transfer means for dragging the bulk material along a length of the first transfer means toward a dispensing outlet near the bottom end of the support column, said first transfer means having a contacting length, a base end, a rotational axis and a distal end;

(1.4) a first support frame having a base end, intermediate support section, and distal end, said distal end being coupled near the distal end of the first transfer means and being adapted with means for supporting the first transfer means during rotational movement;

(1.5) a first drive motor mounted to the first transfer means and first support frame, said first drive motor further including means to apply a rotational drive force to the first transfer means;

(1.6) an axial mount coupled between the base of the first support frame and bottom end of the support column, said axial mount including means for enabling rotational declination of the first transfer means and first support frame from (i) a vertical orientation wherein the first transfer means is nearly parallel with the vertical axis of the support column, (ii) through intermediate angles of declination, to (iii) a substantially horizontal orientation wherein the first transfer means is adjacent the support floor of the storage area;

(1.7) variable suspension means coupled between the support column and the first support frame for enabling variable selection and adjustment of declination of the first transfer means with respect to the support column by permitting rotational declination of the first transfer means with respect to the axial mount;

(1.8) rotational displacement means coupled to the first support frame for rotating the first transfer means and first support frame about the vertical axis of the support column to thereby drive said first transfer means along a rotational path and provide for progressive removal of conical layers of surface material with each successive rotation and adjustment of declination; and (1.9) a torque assist device coupled directly to the distal end of the first support frame including a moving contact surface configured to rotate about at least one rotational axis to engage and compact a top, inclined surface of the bulk material, said moving contact surface being mounted at the distal end of the first support frame in a position such that said at least one rotational axis of the moving contact surface is positioned immediately adjacent and approximately parallel to said rotational axis of the first elongate transfer means.

2. An apparatus as defined in claim 1, wherein the torque assist device comprises a rotating track assembly supported on a rotating track carrier, said projecting teeth including a plurality of track elements projecting outward from the track assembly to provide a gripping edge which extends into the bulk material as the track assembly moves along the surface of the bulk material.

3. An apparatus as defined in claim 2, further comprising a variable drive motor coupled to the track carrier to provide power to rotate the track carrier and track assembly at variable speeds.

4. An apparatus as defined in claim 2, wherein the torque assist device is coupled to the distal end of the first elongate transfer means such that the vertical level of the track which engages the top surface of the bulk material is substantially equal to the vertical level of a lowest edge of the first elongate transfer means which immediately precedes a path of movement for the track, thereby positioning the track for engagement with a freshly exposed surface of bulk material resulting from displacement a surface layer of material by the first elongate transfer means.

5. An apparatus as defined in claim 4, wherein the torque assist device is coupled at a distal end of the first support frame in a trailing position with respect to the support frame.

6. An apparatus as defined in claim 2, wherein the track assembly includes a track section which is substantially planar along an engaging surface of the bulk material, said track section being configured to apply only two concurrent track elements into the surface of bulk material along this planar section.

7. An apparatus as defined in claim 2, wherein the track element comprises a section of angle iron coupled at one side to the track assembly, the remaining side projecting outward from the track assembly to provide the gripping edge to engage the bulk material.

8. A device as defined, in claim 1, wherein the torque assist device comprises a first circular rim having certain dimensions, said moving contact surface comprising an outer surface of the first circular rim mounted on a first central axle, said plurality of teeth projecting from the outer surface of the rim, said rim having a width sufficient to ride along the top of the compacted material without disturbing the material.

9. A device as defined in claim 8, comprising a second circular rim having the same dimensions as the first circular rim and being mounted on an axle having a common axis with the first axle, said second rim including a plurality of teeth projecting from the outer surface of the second rim.

10. A device as defined in claim 9, wherein the axles of the first and second rims are part of a common axle comprising a drive shaft powered by a drive motor.

11. A device as defined in claim 8, wherein the first circular rim has a width of at least one inch and the teeth comprise rectangular blades.

12. A device as defined in claim 11, wherein the first circular rim has a radius of at least five inches, and the distance between teeth is at least $\frac{1}{2}$ the length of the radius and no more than approximately "$\pi r/4$", said teeth projecting a length of less than $\frac{1}{2}$ the length of the radius.

13. A device as defined in claim 12, wherein the dimensions are proportional to relative values wherein the radius of the first circular rim is approximately 7 inches, the distance between the teeth is approximately 5.5 inches, and the length of the teeth is approximately $2\frac{1}{2}$ inches.

14. A device as defined in claim 1, wherein the rotational displacement means comprises rotational means coupled at the top end of the support column to enable the support column to rotate about its vertical axis, said rotational displacement means further including a drive motor for rotating the support column at a controlled linear movement rate wherein movement rate of the first transfer means equals the movement rate of the torque assist device.

15. An apparatus as defined in claim 1, further comprising:
- (16.1) a dome storage structure having a top opening centrally disposed therein;
- (16.2) a support floor formed as a flat slab with a perimeter boundary defined by base edges of the dome structure, said support floor including an outlet port centrally located within the support floor, said outlet support being coupled to a subfloor passage configured to receive bulk materials by gravity flow for subsequent conveyor delivery to an exterior pickup location;
- (16.3) said support column being attached to the support floor with its vertical axis in approximate alignment with the outlet port such that bulk materials dragged by the first transfer means drop into the outlet for subsequent removal.

16. An apparatus as defined in claim 1, wherein the first support frame comprises an elongate truss support span extending from the distal end of the first transfer means to the opposing base end and including opposing end plates having bearing mounts which couple at the respective base and distal ends of the first transfer means, said torque assist device being mounted at the distal end of the truss support span.

17. A device as defined in claim 1, wherein the variable suspension means further includes control means for incrementally advancing the first transfer means and attached torque assist device through a series of predetermined declinations to sequentially remove conical layers of bulk material symmetrically about the support column, providing a freshly exposed top surface of said bulk material.

18. A device as defined in claim 1, further comprising:
- a third transfer means supported on a third support frame, said third support frame having a base and being coupled to the support column approximately along a plane defined by the first transfer means and the support column, but on an opposite side of the support column, said third transfer means having a distal end;
- a rotational drive motor mounted on the distal end of the third transfer means and including means to apply a rotational drive force to the third transfer means;
- an axial mount coupled between the base of the third support frame and bottom end of the support column, said axial mount including means for enabling rotational declination of the third transfer means and third support frame from (i) a vertical orientation wherein the third transfer means is nearly parallel with the vertical axis of the support column, (ii) through intermediate angles of declination, to (iii) a substantially horizontal orientation wherein the third transfer means is adjacent the support floor of the storage area;
- variable suspension means coupled between the support column and the third support frame for enabling variable selection and adjustment of declination of the third transfer means with respect to the support column by permitting rotational declination of the third transfer means with respect to the axial mount;
- rotational displacement means coupled to the third support frame for rotating the third transfer means and third support frame about the vertical axis of the support column to thereby drive said third transfer means along a rotational path and provide for progressive removal of conical layers of surface material with each successive rotation and adjustment of declination;
- a torque assist device coupled at the distal end of the third transfer means and including a moving contact surface configured to engage and compact a top surface of the bulk material, said contact surface further including a plurality of projecting teeth having sufficient length to penetrate the top surface and provide a gripping force to urge the torque assist device and third transfer means along the top surface, each of said teeth being displaced a sufficient distance from other projecting teeth such that entry of each tooth into the top surface of the bulk material does not disturb compaction and resulting gripping force support of the bulk material penetrated by the other projecting teeth as the contact surface moves along the top surface of the bulk material, said assist device being oriented with respect to the third elongate transfer means to apply a tangential, gripping force along the rotational path of the third elongate transfer means in response to resistance of the compacted bulk material against the projecting teeth.

19. The apparatus of claim 1 wherein the first transfer means comprises a first auger of fixed length configured for rotational movement about a first longitudinal axis, said auger being configured to cut away a layer of bulk material, leaving a fresh surface exposed for supporting the moving contact surface of the torque assist device.

20. The apparatus of claim 1 further comprising a second transfer means including a second auger configured for rotational movement about a second longitudinal axis, said auger being configured to cut away a layer of bulk material, to expose a fresh surface of material for supporting the moving contact surface of the torque assist device.

21. A device as defined in claim 1, wherein said moving contact surface further includes a plurality of projecting teeth having sufficient length to penetrate the top surface and provide a gripping force to urge the torque assist device and first transfer means along the top, inclined surface, each of said teeth being displaced a sufficient distance from other projecting teeth such that entry of each tooth into the top, inclined surface of the bulk material does not disturb compaction and resulting gripping force support of the bulk material penetrated by the other projecting teeth as the contact surface moves along the top surface of the bulk material.

22. A device as defined in claim 1, wherein the moving contact surface is mounted such that said moving contact surface is held substantially parallel to the contacting length of said first transfer means and is thereby confined to parallel movement with said first transfer means through said intermediate angles of declination to thereby apply a tangential, gripping force to the first elongate transfer means along the rotational path thereof in response to resistance of the compacted bulk material against the projecting teeth.

23. A method for removing compacted bulk materials from a laterally enclosed storage area, said method comprising the steps of:
- (22.1) positioning a support column having a top end, a bottom end, and a vertical axis at a central location of the storage area;
- (22.2) securing a base mount between the bottom end of the support column and a support floor contained within the storage area, said base mount providing a fixed vertical orientation to the support column within a central section of the storage area;

(22.3) attaching to a first support frame a first elongate transfer means for contacting particulate bulk materials with a contacting length thereof and for dragging said particulate bulk materials along a length thereof toward a dispensing outlet near the base of the support column, said first transfer means having a base end, a rotational axis and a distal end;

(22.4) attaching the first support frame at a base end thereof to the support column with an axial mount for enabling rotational declination of the first transfer means and first support frame from (i) a vertical orientation wherein the first transfer means is nearly parallel with the vertical axis of the support column, (ii) through intermediate angles of declinations, to (iii) a substantially horizontal orientation wherein the first transfer means is adjacent the support floor of the storage area, said first support frame having a distal end;

(22.5) coupling a first drive motor to the first transfer means and first support frame, said first drive motor further including means to apply a drive force to the first transfer means;

(22.6) storing bulk material within the lateral storage area wherein the first transfer means is at least partially buried within the bulk material with the first transfer means at an declination greater than fifty degrees with respect to the support floor;

(22.7) commencing removal of the bulk material by activating the first drive motor on the first transfer means, thereby assisting free fall along an inclined flow of stored bulk materials to an outlet port in the support floor of the storage area;

(22.8) concurrently rotating the first transfer means with the activated drive motor about the vertical axis of the support column to remove a conical volume of bulk material forming an declination of exposed surface of bulk material of greater than forty degrees with respect to the vertical axis;

(22.9) positioning the first transfer means in an inclined orientation of less than fifty degrees with respect to the support floor;

(22.10) moving a torque assist device having a moving contact surface and being coupled directly to the distal end of the first support frame across a top, inclined surface of the compacted bulk material by causing said moving contact surface to rotate about at least one rotational axis and to engage and compact the top, inclined surface at the distal end of the first elongate transfer means in a position such that said moving contact surface is positioned immediately adjacent to said first elongate transfer means such that said moving contact surface is mounted at the distal end of the first support frame in a position such that said at least one rotational axis of the moving contact surface is positioned immediately adjacent and approximately parallel to said rotational axis of the first elongate transfer means.

* * * * *